J. A. MAYNARD.
CARRIAGE AND CAR WHEEL AND AXLE BOX.
No. 105,228. Patented July 12, 1870.
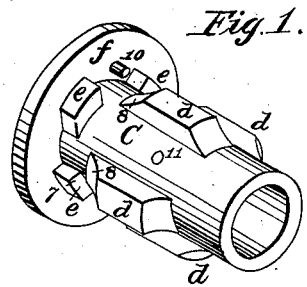
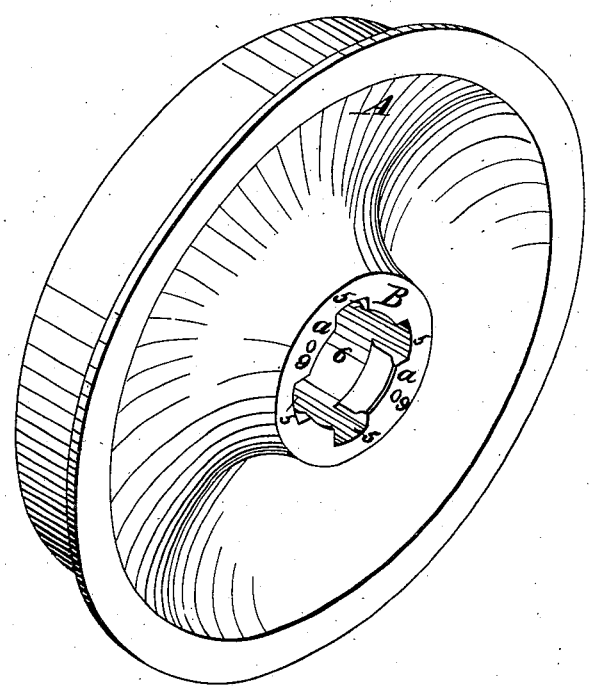
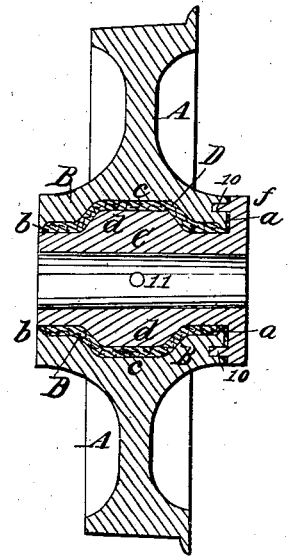
Witnesses:
Inventor:

United States Patent Office.

JAMES A. MAYNARD, OF NEWTONVILLE, MASSACHUSETTS.

Letters Patent No. 105,228, dated July 12, 1870.

IMPROVEMENT IN CARRIAGE AND CAR-WHEELS AND AXLE-BOXES.

The Schedule referred to in these Letters Patent and making part of the same.

*To all whom it may concern:*

Be it known that I, JAMES A. MAYNARD, of Newtonville, in the county of Middlesex and State of Massachusetts, have invented certain Improvements in Carriage and Car-Wheels and Axle-Boxes, and in the method of securing them together, of which the following is a full, clear, and exact description, reference being had to the accompanying drawing making part of this specification, in which—

Figure 1 is a perspective view of an axle-box of my improved construction.

Figure 2 is a perspective view of a wheel made to receive the same.

Figure 3 is a vertical longitudinal section through the center of the wheel, its axle-box secured therein by means of an elastic packing, which is molded and vulcanized around the axle-box when in place within its hub.

To relieve the concussion and noise incident to wheels of the ordinary construction, and to diminish in a great degree the consequent wear of the various parts, is the object of my invention, which consists in an axle-box secured within the hub of a wheel, and surrounded by a packing of rubber or other suitable elastic material, which, in its plastic state, is forced into the hub around the outside of the box, and, when in this position, is vulcanized or cured, a solid or porous yielding cushion being thus interposed between the box and wheel, the result of which is to approximate as nearly as possible to the removal of the above-mentioned objections.

To enable others skilled in the art to understand and use my invention, I will proceed to describe the manner in which I have carried it out.

In the said drawing—

A is a wheel, the interior of the hub B of which is of the form shown in fig. 3, the diameter of the flange at the inside $a$ and that at the outside $b$ of the hub being less than the diameter of the hollow interior at or near its center, $c$.

5 5 are two pairs of recesses, cut from the inner side of the hub, diametrically opposite each other, and communicating with the hollow interior thereof, the object of the recesses 5 and the opening 6, in the hub, being for the reception of an axle-box, C, provided with a series of projections or enlargements, $d\ e$, each of the latter projections $e$ abutting against the inside of a flange, $f$, and being placed opposite the space between two contiguous projections, $d$, an interval or space around the box being formed between the outer ends 7 of the projections $e$ and the inner ends 8 of the projections $d$, by which construction two rows of clutches are formed to prevent any accidental displacement of the axle-box from its position in the hub.

9 9 are holes made in the outside of the hub, for the reception of pins 10, projecting from the inside of the flange $f$ of the axle-box, to keep it centrally within the hub when the packing D, of rubber or other elastic material, in a soft, semi-liquid or plastic state, is forced by pressure, or otherwise entered, in the space within the hub around the axle-box, one or more holes, 11, being provided through which to inject or insert the semi-liquid elastic material therein. I prefer to use, for the purpose of forcing the rubber into place, a cylinder, surrounded by a steam-jacket and provided with a plunger. Other methods may, however, be employed.

After the operation of filling the interior of the hub around the axle-box, the whole is placed within a receptacle, where it is cured or vulcanized in a well-known manner. As before remarked, the space within the hub contracts from the center to its flanges on its exterior, $a\ b$, which construction prevents all possibility of the elastic packing being squeezed out of the hub through the openings in its exterior.

When the axle-box is in place, and surrounded by the elastic packing, the projections $e$ fit loosely into the recesses 5 of the hub, and the axle-box and hub are so securely locked together that they both revolve and move laterally in common. I intend to use either a solid, compact elastic packing, or a porous elastic packing within the hub, as both may be employed to advantage under different circumstances. It is evident I may dispense with either one or both series of the projections $d\ e$, and secure the axle-box in place by a wedge, pin, screw, or bolt, without departing from the spirit of my invention, but I prefer to employ an axle-box with projections, formed in one homogeneous piece with the box, as the trouble and expense of using bolts are thereby avoided, and the parts, when put together, are more closely and firmly united.

Claim.

What I claim as my invention, and desire to secure by Letters Patent, is—

An elastic packing, surrounding a carriage or other axle-box, said packing molded and vulcanized within an irregular chamber, as described, after the box is secured in place within the hub, substantially in the manner and for the purpose set forth.

Also, an axle-box, provided with projections $d\ e$, in combination with a molded and vulcanized elastic packing D, as described, and a wheel, A, provided with recesses 5 5, and having the interior of its hub made for its reception, substantially as and for the purpose set forth.

Witness my hand this 3d day of June, A. D. 1870.

JAS. A. MAYNARD.

Witnesses:
N. W. STEARNS,
W. J. CAMBRIDGE.